Jan. 31, 1950

A. G. HOSE ET AL 2,496,052

SEAM FOR WOVEN WIRE FABRIC

Filed March 11, 1948

INVENTORS.
Alfred G. Hose and Donald C. Dilley
BY
Bates, Teare & McBean
ATTORNEYS.

Patented Jan. 31, 1950

2,496,052

UNITED STATES PATENT OFFICE 2,496,052

SEAM FOR WOVEN WIRE FABRIC

Alfred G. Hose, Lakewood, and Donald C. Dilley, Shaker Heights, Ohio, assignors to The Lindsay Wire Weaving Company, Cleveland, Ohio, a corporation of Ohio Application March 11, 1948, Serial No. 14,364

4 Claims. (Cl. 139—425)

1

This invention relates to a seam connecting the ends of a wire fabric to produce an endless belt suitable for use as a pulp carrier in a Fourdrinier paper making machine. Such belts have heretofore been produced by connecting the abutting ends of the fabric by stitching wires or by soldering the ends together with silver solder. The use of stitching wires presents difficulties in forming a perfectly smooth seam which will not injure the paper being made. The use of silver solder joining the ends may produce a perfectly smooth seam but difficulties have developed from electrolysis. The silver solder and the bronze wire employed in the fabric result in a junction of two dissimilar metals which when wet in use has been found to constitute an electric couple generating sufficient current to gradually corrode the adjacent ends of the bronze wire.

The object of this invention is to provide a solder seam which will have proper strength and proper adherence to the bronze wires to make a mechanically strong seam without the attendant disadvantage of electrolysis affecting the bronze wires. We have discovered that the desired result can be accomplished by the employment of a seam of a proper alloy of gold. Gold being highly electro-positive will not generate the undesirable electric currents when united to the bronze wires, but pure gold is too soft and does not have sufficient strength to properly hold the wires of the belt.

We have found that we can accomplish the desired result by using an alloy of gold such as the commercial 14 carat gold. In the endeavor to reduce the expense of such a seam we have discovered that an alloy similar to commerial 8 carat gold is effective and has the necessary strength and does not produce the electrolysis. In fact, the gold content may be somewhat further reduced below 8 carat. We believe the effective limitation to be between 4 carat and 18 carat gold.

Our invention comprises a woven wire belt having its fabric joined by a seam of an alloy of gold.

We prefer to use 8 carat gold having a melting point of about 1250° Fahrenheit and having a composition of approximately gold 33%, silver 26%, copper 21%, zinc 10% and cadmium 10%.

The accompanying drawings illustrate by way of example a woven wire fabric of bronze wires joined by our seam of an alloy of gold to make an endless belt having special characteristics to meet the conditions present in a Fourdrinier machine.

2

Figure 1:
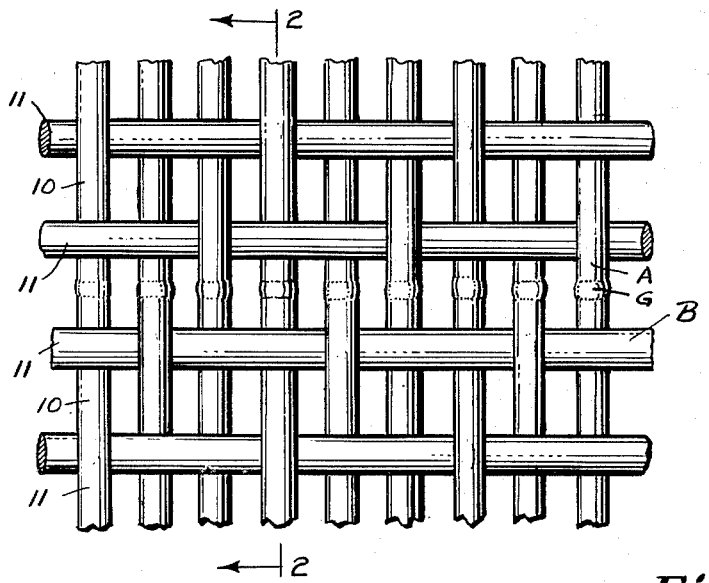
Figure 2:
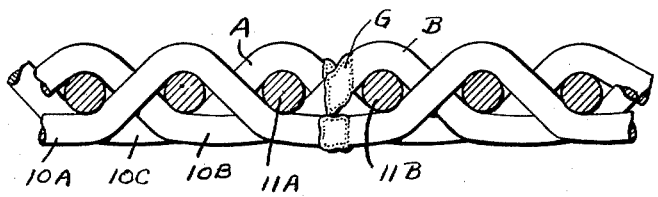
Figure 3:
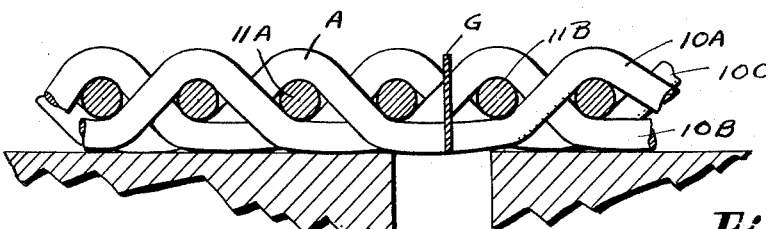
Figure 4:
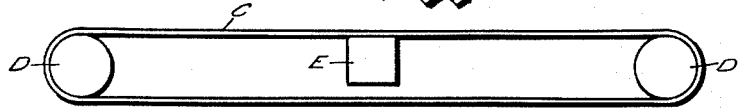

In the drawings, Fig. 1 is a plan view of a woven wire fabric of twill weave having a seam made in accordance with the present invention; Fig. 2 is a section taken on a plane indicated by the lines 2—2 on Fig. 1; Fig. 3 is a section similar to Fig. 2 but showing a fusible strip of gold alloy in position prior to the application of fusing heat thereto; Fig. 4 is a diagrammatic view of the fabric joined by our seam into an endless belt mounted on the rollers and intermediately passing across a suction box of a Fourdrinier machine.

We have shown our invention in connection with a woven wire fabric having a twill weave, wherein the warp wires are designated 10 and the weft wires 11. One end of the fabric, indicated in general at A, is attached to the other end, designated B, by a seam that is made by directly joining the end of each warp wire to the opposite end of the same warp wire. As shown in Fig. 1, the joint between the ends of respective warp wires embodies a soldered connection wherein the solder, designated G, is confined only to the warp pickets.

We indicate in Fig. 4 the fabric joined by the seam G into an endless belt C mounted on two rollers D and passing across a suction box E of a Fourdrinier machine, for which use this belt is especially designed.

To make the seam in accordance with the present invention, each end of the fabric is cut in the same relative location so that when the warp pickets are brought together, the pattern of the weave is maintained across the seam identical with that in the body of the fabric. Thus, as appears in Fig. 2, the warp wire 10A at the left hand side of the seam continues the pattern of the weave across the seam by virtue of the fact that the fabric on the end designated B is cut in the same relative location between weft wires that will permit the warp wire 10A to pass beneath two weft wires 11A and 11B and thereby continue the normal pattern of the weave across the seam. Similarly, the pattern is continued across the seam opening by the warp wires 10B and 10C, each warp wire passing over one and then under two weft wires in succession.

After the fabric has been cut transversely as aforesaid, the ends are brought together with the opposite warp pickets in approximate alignment against opposite sides of a strip of gold alloy indicated at G in Fig. 3. A torch is applied progressively thereto, while the ends of the fabric are pressed against the sides of the strip and until the solder is melted, and adheres to each warp picket adjacent the joint as is shown in Fig. 1. By selecting a size of solder strip sufficient so that the solder will adhere only to the warp pickets, instead of running down to the adjacent weft wires, we can obtain a seam wherein the area of the interstices at the seam opening is substantially the same as that of the openings between any two adjacent weft wires in the body of the fabric. Thus, the drainage characteristic at the seam is the same as that in the body of the fabric. We have found that a solder strip having a cross sectional length of .0185 inch and a cross sectional width of .005 inch is satisfactory for a twill weave of 60 mesh, having warp wires of .0095 inch in diameter, and weft wires of .0112 inch in diameter.

An advantage of a woven wire belt having a seam made in accordance with the present invention is the fact that while the seam possesses strength and pliability to withstand all bending stresses, and does not mark the paper being formed and does not retard the drainage through the fabric, it does have the further advantage of not chemically reacting with the bronze warp wires to produce electrolysis which would cause deterioration of such wires.

We claim:

1. A woven wire belt for a Fourdrinier machine having warp wires of bronze connected at their adjacent ends by an alloy of gold.

2. A woven wire belt for a Fourdrinier machine having warp wires of bronze connected at their adjacent ends by a gold alloy of between 4 and 18 carat fineness.

3. A woven wire belt for a Fourdrinier machine having warp wires of bronze connected at their adjacent ends by approximately 8 carat gold having a melting point of about 1250° Fahrenheit.

4. A woven wire belt for a Fourdrinier machine having warp wires of bronze connected at their adjacent ends by gold alloy having substantially the following composition: gold 33%, silver 26%, copper 21%, zinc 10% and cadmium 10%.

ALFRED G. HOSE.
DONALD C. DILLEY.

REFERENCES CITED

The following references are of record in the file of this patent:

UNITED STATES PATENTS

| Number | Name | Date |
| --- | --- | --- |
| 1,263,656 | Fahrenwald | Apr. 23, 1918 |
| 2,042,155 | Leach | May 26, 1936 |
| 2,088,448 | Specht | July 27, 1937 |
| 2,189,640 | Powell | Feb. 6, 1940 |
| 2,220,961 | Kern | Nov. 12, 1940 |
| 2,295,201 | Chayes | Sept. 8, 1942 |
| 2,310,231 | Goldsmith | Feb. 9, 1943 |

FOREIGN PATENTS

| Number | Country | Date |
| --- | --- | --- |
| 93,308 | Sweden | June 30, 1938 |
| 483,175 | Great Britain | Apr. 13, 1938 |